(12) United States Patent
Boussemart et al.

(10) Patent No.: US 8,172,453 B2
(45) Date of Patent: *May 8, 2012

(54) APPLIANCE AND METHOD FOR PREPARING A FROTH FROM A FOOD LIQUID

(75) Inventors: Christophe S. Boussemart, Lugrin (FR); Alfred Yoakim, St-Legier-la Chiesa (CH); Francesco Chiarella, Pleasant Valley, NY (US)

(73) Assignee: Nestec S.A., Vevey (CH)

( * ) Notice: Subject to any disclaimer, the term of this patent is extended or adjusted under 35 U.S.C. 154(b) by 47 days.

This patent is subject to a terminal disclaimer.

(21) Appl. No.: 12/712,535

(22) Filed: Feb. 25, 2010

(65) Prior Publication Data

US 2010/0151101 A1    Jun. 17, 2010

Related U.S. Application Data

(60) Division of application No. 11/746,457, filed on May 9, 2007, now Pat. No. 7,669,517, which is a continuation of application No. PCT/EP2005/011921, filed on Nov. 8, 2005.

(30) Foreign Application Priority Data

Nov. 12, 2004    (EP) .................................... 04026939

(51) Int. Cl.
    *B01F 13/08* (2006.01)
(52) U.S. Cl. .......................... 366/145; 366/146; 366/274
(58) Field of Classification Search .................. 366/145, 366/146, 273, 274
    See application file for complete search history.

(56) References Cited

U.S. PATENT DOCUMENTS

| 2,282,866 A | 5/1942 | Hagen |
| 2,459,224 A | 1/1949 | Hendricks ...................... 366/274 |
| 2,518,758 A * | 8/1950 | Cook ............................ 366/274 |
| 2,932,493 A | 4/1960 | Jacobs .......................... 366/274 |
| 3,168,294 A | 2/1965 | Tadashi ......................... 366/206 |
| 3,172,645 A | 3/1965 | Price, Jr. ....................... 366/273 |
| 3,356,349 A | 12/1967 | Keppler ........................ 366/274 |
| 3,421,528 A | 1/1969 | Gomez et al. ................. 134/188 |
| 4,162,855 A | 7/1979 | Bender ......................... 366/274 |
| 4,209,259 A | 6/1980 | Rains et al. ................... 366/273 |
| 4,537,332 A | 8/1985 | Brown et al. ................. 222/190 |

(Continued)

FOREIGN PATENT DOCUMENTS

CN    2057839    6/1990

(Continued)

OTHER PUBLICATIONS

International Search Report, PCT/EP2005/11921 mailed Feb. 14, 2006.

(Continued)

*Primary Examiner* — David Sorkin
(74) *Attorney, Agent, or Firm* — Winston & Strawn LLP

(57) ABSTRACT

A method for preparing a froth from a milk-based liquid from an appliance which includes a tank for receiving liquid that is to be frothed, and in which liquid a rotatable stirrer is positioned, a stand associated with the tank, and a system for driving the stirrer. The stirrer drive system and the stirrer include magnetic elements allowing the stirrer to be rotationally driven magnetically in the tank. At least one disturbance member is also provided to break or prevent symmetric circulation of the liquid about the median vertical axis of the tank.

20 Claims, 8 Drawing Sheets

U.S. PATENT DOCUMENTS

| | | | |
|---|---|---|---|
| 5,048,402 A | 9/1991 | Letournel et al. ............... 99/348 |
| 6,318,247 B1 | 11/2001 | Di Nunzio et al. ............. 99/348 |
| 6,568,844 B1 * | 5/2003 | Arrthun et al. ................ 366/274 |
| 6,712,497 B2 | 3/2004 | Jersey et al. ................... 366/274 |
| 7,669,517 B2 | 3/2010 | Boussemart et al. ........... 99/287 |
| 2001/0036124 A1 | 11/2001 | Rubenstein ................... 366/205 |
| 2005/0072310 A1 | 4/2005 | Kim ............................... 99/348 |
| 2006/0018187 A1 | 1/2006 | Donna et al. ................. 366/129 |
| 2007/0221068 A1 | 9/2007 | Boussemart et al. .......... 99/279 |

FOREIGN PATENT DOCUMENTS

| | | |
|---|---|---|
| CN | 1602783 | 4/2005 |
| DE | 945183 | 7/1956 |
| DE | 1 131 372 B | 6/1962 |
| DE | 1 554 670 A1 | 2/1970 |
| DE | 3530764 | 3/1986 |
| DE | 89 15 094 U1 | 2/1990 |
| DE | 69006836 | 6/1994 |
| DE | 29602684 | 6/1996 |
| DE | 196 24 648 A1 | 1/1998 |
| EP | 1 520 498 | 4/2005 |
| FR | 2 795 875 A1 | 1/2001 |
| GB | 243082 | 11/1926 |
| GB | 2 165 260 A | 4/1986 |
| JP | 60151452 | 8/1985 |
| JP | 60194914 | 10/1986 |
| JP | 63177821 | 7/1988 |
| JP | 3091839 | 2/2003 |
| JP | 2004507279 | 3/2004 |
| WO | WO 03/003888 A1 | 1/2003 |
| WO | WO 03/092548 A1 | 11/2003 |
| WO | WO 2004/043213 A1 | 5/2004 |
| WO | WO 2006/050900 | 5/2006 |

OTHER PUBLICATIONS

Notice for Rejection of JP2007-540557, dated Apr. 5, 2011.
International Search Report & Written Opinion, PCT/EP2008/056349, mailed Oct. 27, 2008.

\* cited by examiner

APPLIANCE AND METHOD FOR PREPARING A FROTH FROM A FOOD LIQUID

CROSS-REFERENCE TO RELATED APPLICATIONS

This application is a division of application Ser. No. 11/746,457 filed May 9, 2007 now U.S. Pat. No. 7,669,517, which is a continuation of International application PCT/EP2005/011921 filed Nov. 8, 2005, the entire content of each of which is expressly incorporated herein by reference thereto.

BACKGROUND

The present invention relates to an appliance and to a method for preparing a froth from a food liquid such as milk and is intended, for example, to be used in the context of the preparation of beverages such as cappuccinos, milky coffees, café latte and macchiato, hot chocolate and other speciality hot beverages.

Speciality beverages in which at least a portion is made up of froth are increasingly becoming all the rage. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

A first disadvantage with this method is that it entails having a coffee machine equipped with a steam outlet, and not all machines are.

Another disadvantage lies in the fact that it is generally not possible to prepare the froth at the same time as preparing the coffee, unless a complex and expensive machine with two separate fluid circuits, one for extracting the coffee and the other for producing steam, is available.

Another disadvantage associated with the use of coffee machines with a steam outlet stems from the fact that the system for heating the water in these machines, most often a thermoblock, has to be kept constantly switched on in order to produce the steam without having to wait. These machines therefore consume large amounts of power, which makes them not very economical to operate. It must also be noted that steam pipes soon become scaled up when the water used is hard water and this entails regular maintenance in order to keep them in good condition.

Another disadvantage with this type of machine stems from the fact that the quality of the froth is dependent on the skill of the user which means that these machines do not allow the froth obtained to have reproducible properties and a uniform quality.

Another disadvantage stems from the fact that the pipes in contact with the milk are difficult and not very practical to clean.

There also exists mechanical stirring appliances which are usually intended for domestic use for beating froth from more or less viscous food products such as eggs, ice, juices or the like. The problem with these appliances is of several natures which means that they are ill-suited to producing froth from a milk-based liquid for making a beverage. One disadvantage, for example, stems from the fact that these appliances stir a liquid or a paste in the cold state, considerably limiting their potential use. In addition, milk does not froth as convincingly when cold or at ambient temperature.

Another disadvantage stems from the fact that these appliances are ill-suited to frothing the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome.

These appliances also have a stirring and driving mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

Another disadvantage with these appliances stems from the fact that frothing in these appliances is not optimal for reasons associated with the arrangement of the stirring means. Some appliances have a stirring means positioned in the middle of the tank. Such an arrangement is not efficient in quickly converting a volume of milk-based liquid into a rich froth.

Other appliances have several stirrers. These arrangements are generally mechanical with gearing means needed to coordinate the rotation of the stirrers, and this makes the system intrusive, and therefore less hygienic, increases the number of parts and makes cleaning a more painstaking operation.

U.S. Pat. No. 6,318,247 relates to an appliance for preparing hot beverages or food with stirring such as hot chocolate, for example. The appliance comprises a system for driving a stirrer of the magnetic effect type. It does, however, have several disadvantages. Firstly, in such an appliance, the liquid or froth is stirred coaxially with respect to the central axis of the tank, and this causes a circulation in which some layers of liquid or froth, particularly the peripheral layers, are not stirred as extensively as others, particularly the layers near the middle, because of the centrifuging effect produced by the stirrer. Such a circulation is therefore not suited to producing a froth of sufficient quality or to reducing the time needed to produce this froth. In addition, the structure of the appliance is not hygienic for treating a milk-based liquid and cleaning is not made any easier by such a construction.

Other devices for stirring food products which have more or less the same disadvantages are described in patent documents WO 2004/043213 A1 or DE 196 24 648 A1.

Other stirring systems of the magnetic engagement type are described in U.S. Pat. Nos. 2,932,493, 4,537,332 and 6,712,497 and in German patent application DE 1 131 372, but none of these provide solutions suited to producing a quality froth in a short time and hygienically.

German Utility model DE 89 15 094 relates to a refrigerated pot for dispensing a milk-based beverage. The pot comprises refrigerating means and forced-convection means in the form of a magnetic rotor. Such a device is not suited to converting the liquid into a froth but simply keeps the liquid uniformly at the refrigeration temperature for preservation.

U.S. Pat. No. 3,356,349 relates to a stirring device comprising a heated tank, magnetic driving mechanism positioned under the tank for driving a hub located in the middle of the tank. The hub is associated with a stirring element which is offset with respect to the hub, causing the element an oscillatory movement. Such a principle of stirring may create a loss in magnetic coupling because of the high moment of inertia generated by the offset position of the stirring means with respect to the axis of rotation of the driving mechanism. This problem increases with increasing speed. Such a stirring device can therefore work to stir certain liquids or other substances at low speed but may prove ill-suited to converting liquid into a froth at sufficiently high speed. Incidentally, the document does not mention the conversion of a liquid into a froth using this device.

Thus, there is a need for a device that overcomes the disadvantages of the prior art, and this is now provided by the present invention.

SUMMARY OF THE INVENTION

To alleviate the disadvantages of the prior art, the present invention proposes an appliance that is particularly suited for the production of froth from a milk-based food liquid, and particularly for producing a beverage. This appliance is of more hygienic design, can be cleaned easily, and is simple to use. In addition, the appliance is able to produce a froth having reproducible properties and qualities, and in the shortest possible preparation time. The invention also provides a simple method of preparation by limiting the amount of user intervention. Thus, the appliance is economical to use.

To this end, the invention relates to an appliance for preparing froth from milk or a milk-based liquid, comprising:

a tank for receiving the liquid that is to be frothed, in which liquid a rotatable stirrer is positioned, the tank having a median vertical axis and a bottom;

a stand associated with the tank;

a mechanism for driving the stirrer, a heating device associated with the tank for heating the liquid in the tank and a controller for activating the heating device during stirring, an electrical power supply for electrically powering the driving mechanism;

wherein the driving mechanism and the stirrer are configured in such a way that the stirrer is driven by the driving mechanism through a magnetic drive effect in order to generate the froth, without a mechanical connection member intruding through the wall of the tank; and at least one disturbance member is provided to break or prevent symmetric circulation of the liquid about the median vertical axis of the tank, wherein the disturbance member comprises a magnetic driver that produces at least one magnetic field that is offset with respect to the median vertical axis of the tank and the controller is configured in such a way as to drive the magnetic driver to thereby magnetically drive the stirrer at a speed that is sufficiently high to convert the liquid into the froth as it is being heated.

Another appliance for preparing froth from milk or a milk-based liquid comprises:

a tank to receive the liquid that is to be frothed, in which liquid a rotatable stirrer is positioned, the tank having a bottom and a vertical median axis;

a stand associated with the tank;

a system for driving the stirrer, and a heating device associated with the tank for heating the liquid in the tank and a controller for activating the a heating device during stirring;

with the stirrer drive system and the stirrer itself comprising magnetic elements allowing the stirrer to be rotated magnetically in the tank;

wherein the stirrer drive system and the stirrer are positioned offset with respect to the median vertical axis of the tank so as to prevent symmetric circulation of the liquid in the tank about the median vertical axis of the tank; and wherein the heating device is distributed in such a way as to heat the bottom of the tank.

Yet another appliance for preparing a froth from milk or a milk-based liquid comprises:

tank to receive the liquid that is to be frothed, in which liquid a rotatable stirrer is positioned;

a stand associated with the tank;

a system for driving the stirrer, with the stirrer configured to be driven and held magnetically in the tank by the stirrer drive system; and a cordless frothing unit which is removable with respect to an electrical power supply unit.

The preferred features of these devices are illustrated herein in the detailed description.

The invention also relates to a method for preparing a froth from milk or a milk-based food liquid in an appliance according to the invention. This method comprises positioning a stirrer in a tank having internal and external surfaces, a median vertical axis and a bottom and which contains the liquid to be frothed, and driving the stirrer by a magnetic drive effect, about an axis of rotation offset with respect to the median vertical axis of the tank and at a speed that is sufficiently high to convert the liquid into froth while heating the liquid during the stirring. The heating may be performed by direct and distributed application of the heating elements against the external surface of the tank. Also, the distribution of the heating elements can be arranged to produce an electrical power density at the heated surface of between 15 and 25 watts per $cm^2$ with an area of coverage of the heated surface by the heating elements of at least 40%. Preferably, the stirrer is rotationally driven at a speed of at least 1500 revolutions/minute.

BRIEF DESCRIPTION OF THE DRAWING FIGURES

DETAILED DESCRIPTION OF THE PREFERRED EMBODIMENTS

Figure 1:
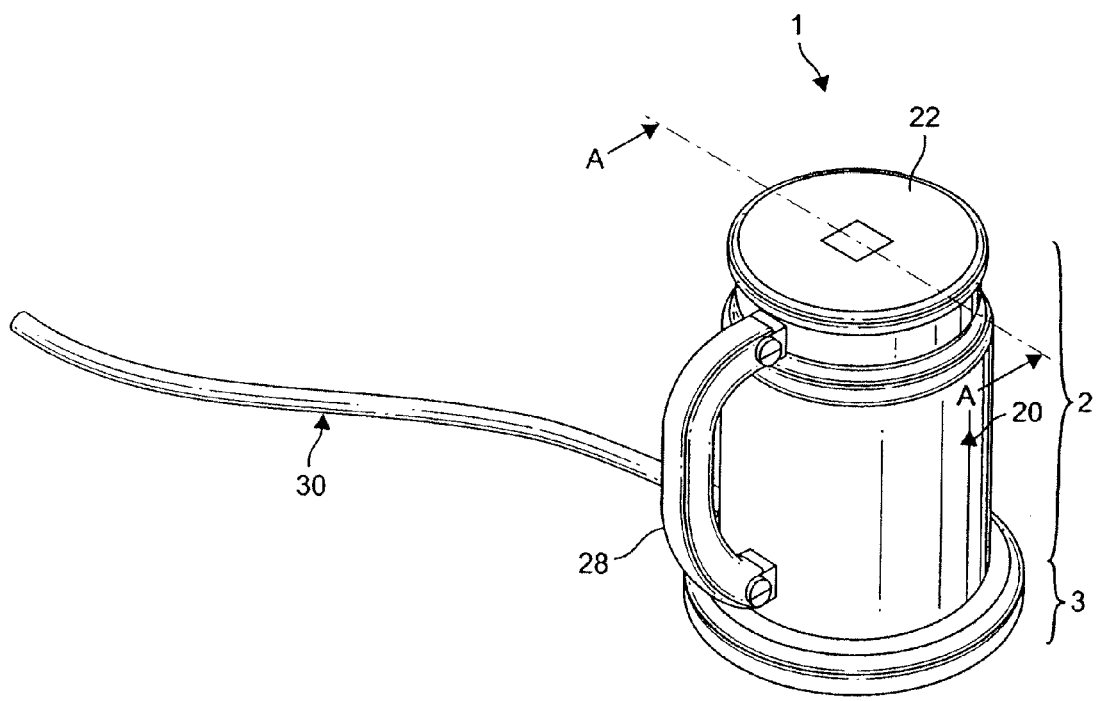
FIG. 1 shows a perspective view of the appliance according to the invention.

One improvement in the appliance of the present invention stems from the fact that the driving mechanism and the stirrer are configured in such a way that the stirrer is driven, through a magnetic drive effect, by the driving mechanism without a mechanical connection member intruding through the wall.

One of the principles of the invention is in fact based on the fact that the appliance is intended to receive and to process a food liquid which readily becomes deposited against the walls of the tank, particularly when heated, and so the intended system for driving the stirrer is non-intrusive and therefore more hygienic and simpler to construct and operate.

Another characteristic is that a disturbance member is provided to break or prevent a liquid circulation that is symmetric and more or less coaxial about the median vertical axis of the tank. Such a configuration ensures that the circulation of fluid in the tank is sufficiently disturbed thus reducing the time needed to produce the froth and giving a higher froth/liquid ratio. A configuration such as this makes it possible to obtain results using the non-intrusive system of the invention, and therefore with just one stirrer, thus greatly simplifying the appliance and reducing its cost.

As a preference, a heating device is positioned in association with the tank to heat the liquid in the tank. A heating device allow the liquid and the froth to be heated at the same time as the froth is being produced.

According to one embodiment of the invention, the appliance comprises a driving mechanism producing at least one magnetic field that is offset with respect to the median vertical axis of the tank. An offset magnetic field such as this thus acts as a disturbance member by driving the stirrer offset from the middle of the tank. Thus, as a result of the offset position of the stirrer, the layers coaxial to the axis of the liquid, froth or liquid/froth stirrer are stirred through a centrifuging effect in an asymmetric configuration.

Such an arrangement is non-intrusive which means that no transmission element is needed through the tank, in order to connect the driving mechanism to the stirrer, or to connect or guide the stirrer with respect to the tank, thus making the appliance more hygienic and easier to clean.

As a preference, a stirrer positioning element is also configured to position the stirrer, in engagement with the driving mechanism along an axis of rotation that is offset with respect to the median vertical axis of the tank so that the stirrer, when rotationally driven, produces non-coaxial circulation of the liquid with respect to the median vertical axis. A positioning element ensures that the stirrer is correctly in place locally at the magnetic field thus defined. It prevents the stirrer from leaving the field before, during or after the stirring operation. It indicates the position of the stirrer to the user in a simple way and requires no special removal/refitting thereof. In addition, when the contents of the tank are poured out, the magnetic effect created between the stirrer and the driving mechanism holds the stirrer in place in the tank.

In one embodiment, the positioning element is a relief formed in the surface of the tank and has at least a shape that more or less complements the stirrer. The stirrer can thus engage the relief or recess. Sufficient clearance may be provided to allow the stirrer to be rotationally driven without excessive friction. In an alternative, surfaces made of materials of construction having low coefficients of friction may be provided.

Thus, the stirrer is put in place simply by simple engaging of shapes without requiring any special tool. The stirrer may be free or connected by a conventional connector, such as and preferably of the quick coupling type.

The relief or recess and the bottom of the tank together forms an integral wall. Thus, there is no need to resort to sealing elements, thus reducing the complexity and rendering the appliance more hygienic. The bottom of the tank is understood to mean the entire surface in the bottom part of the tank and more or less forming the entire width of the tank in this part.

The relief is, for example, provided in the actual wall of the tank as an inwards indentation of the tank therefore producing, on the outside, a recess in this wall. The recess thus formed on the outside of the tank can therefore serve to house the magnetic drive portion of the driving mechanism so that the stirrer is held in place in elevation and some distance from the bottom of the tank, thus improving the stirring effect by comparison with a stirrer position adjacent to the bottom of the tank. As a preference, the stirrer is an annular element which fits around a relief in the tank.

In one possible variant, the positioning means may be a recess in the internal surface of the tank, in which the stirrer is partially positioned. In any event, the positioning means thus serves to position both along the horizontal axis and along the vertical axis in the tank. It also serves to guide the stirrer and prevents the latter from accidentally leaving the magnetic field during the stirring operation.

The stirrer may adopt various configurations. In one of these, the stirrer has an annular shape with a central slot fitting the relief, acting as a positioning means, the relief projecting from the bottom of the tank, and has at least one magnetically slaved portion positioned near the periphery of the said central slot. A configuration such as this is effective because it allows the stirrer easily to be fitted into the tank. In addition, it allows the stirrer to be kept a certain distance away from the bottom of the tank, which encourages good foaming.

In one embodiment, the driving mechanism comprises a magnetic drive portion which engages on the external side of the tank and inside the relief. The magnetic drive portion thus collaborates with at least the magnetically slaved portion of the stirrer. The magnetic drive portion is thus made to rotate by a spindle associated with an electric motor. Magnetic collaboration between the driving mechanism and the stirrer is therefore closer, reducing the risks of detachment or defective driving, even at high speed.

In one configuration of the stirrer, the latter has a peripheral part possessing stirring elements. These stirring elements may include one or several of the following elements: turns of toroidally-shaped wire, impellers, blades, gratings or needles. Certain elements may prove more effective than others according to the nature of the liquid, for example.

In a preferred embodiment, the tank is cylindrical or more or less cylindrical. However, in one possible variant of the invention, the disturbance member for preventing or breaking a coaxial movement of the fluid in the tank comprises a tank the configuration of which is non-cylindrical with respect to the median vertical axis. The tank may adopt numerous different shapes without departing from the scope of the invention.

In one possible embodiment, the disturbance member comprises walls and/or other obstacles extending in relief into the tank in a manner that is offset with respect to the median vertical axis. Thus, these elements form means which break any purely coaxial circulatory movement of the fluid in the tank. These elements may, for example, be fins or other obstacles extending radially and horizontally and/or vertically towards the interior of the tank. As a preference, these elements are formed as an integral part or as one piece with the rest of the tank.

In another embodiment, the disturbance member comprises a controller programmed to switch the direction of rotation of the stirrer several times while the liquid is being frothed. Specifically, in a symmetrical configuration of rotation of the stirrer in the tank, if just one direction of rotation is maintained, the contents (liquid and froth) move around the tank concentrically with respect to the stirrer and the various layers at the same speed always travel along the same radius and therefore do not mix to create froth. This has the effect of halting the formation of froth. To guard against this problem, discontinuous stirring is therefore envisaged so that the abovementioned centrifuging effect is interrupted at regular or irregular intervals. These regular interruptions in the direction of rotation, which preferably have a frequency of the order of 0.3 to 1 Hz, thus allow the liquid-froth mixture to drop back down and come back into contact with the stirrer in order to be mixed up again as soon as stirring resumes in the opposite direction.

According to one aspect of the invention, the tank has, in the part designed to contain the liquid, a surface which is without joining line or connection between two parts and without any line demarcating an orifice. Specifically, a liquid such as milk tends very quickly to soil any gap region by the deposition of solids. This phenomenon is accentuated if the liquid is heated and the liquid then tends to form a somewhat cooked or burnt layer which is therefore difficult to clean off. By avoiding these areas that encourage solids to accumulate the hygienic risks are reduced and cleaning is made easier. Thus, as a preference, the tank comprises a surface for receiving the liquid which is an integral part. The tank may thus be formed of several elements welded together but which ultimately form an integral part.

To encourage froth to form while at the same time reducing the stirring time, a heating device are provided to heat the liquid in the chamber during stirring. These a heating device are preferably means for directly heating the tank. In one embodiment, they are electrically insulated resistive elements in contact with at least the bottom of the tank. The elements may be chosen from at least one heating circuit of the "thick film" kind in contact with an external surface of the tank, or heating resistive elements of the shielded resistor type in contact with the surface of the tank. Other heating elements may be induction or infrared a heating device, or a combination of these means with heating resistive elements.

In a preferred embodiment, the a heating device comprise a heating circuit of the electrically insulated "thick film" kind printed directly onto the external surface of the bottom of the tank. Such a configuration makes it possible to increase the power density against the tank surface and therefore reduce the time taken to produce the froth because the liquid more quickly reaches the optimum temperature for frothing, and all this is achieved while at the same time avoiding sticking due to a better distribution of the power.

In order to provide a device that is convenient to use and that does not require any particular skill or surveillance of the user, a controller is set to automatically cut off the electrical power to the a heating device and to the electrical motor according to a preset scheme. More particularly, the a controller comprise a temperature sensor associated to the a heating device, wherein the a controller is configured to cut off the electrical supply to the a heating device at a set point temperature that is determined so that the liquid is heated below its boiling point and during a preset time. The preset scheme stored in the a controller is determined by the nature of the liquid (e.g., milk) and the volume of liquid that can be stored in the tank; i.e., the volume of the tank and the use of an eventual fill mark in the tank to indicate to the user the filling level for the liquid in order to obtain a volume of froth of optimal quality according to the preset scheme.

The appliance according to the invention may advantageously comprise a cordless electrical connection assembly allowing the stand and the tank, on the one hand, to be connected to, on the other hand, an electrical power supply base support that can be connected to the mains. Thus, the stand and the tank forming part of a foaming unit may be moved around for filling, servicing and cleaning. To do that, the cordless connection assembly comprises a first connector secured to the bottom of the stand and a second connector secured to the power supply base support, the two connectors being connected together electrically in order to power the electrical means of the stand, while the stand is standing on the base support.

Thus, according to another aspect, the invention relates to an appliance for preparing a froth from a milk-based liquid, comprising a tank to receive the liquid that is to be frothed, in which liquid a rotatable stirrer is positioned, a stand associated with the tank; and a system for driving the stirrer. The stirrer is configured to be driven and held magnetically in the tank by the stirrer drive system and comprises a cordless frothing unit which is removable with respect to an electrical power supply unit.

Thus, one advantage of such an appliance is associated with the mobility of the frothing unit which is obtained by the combination of a magnetic drive and of a cordless power supply. Such a combination of means makes the service of dispensing the froth easier when, for example, the froth is poured into a mug for preparing a cappuccino. In this case, the stirrer is also retained in the tank by a magnetic effect and does not fall out, and need not be removed from the tank while the froth is being served. The magnetic elements are also configured (sizing, position, size, etc.) so that the stirrer is held in the tank without the risk of falling out when the tank is inclined, with its opening directed downward to pour out the froth.

The invention also relates to a method for preparing a froth from a milk-based food liquid in an appliance of the types disclosed herein. The method includes driving the stirrer through a magnetic drive effect, asymmetrically with respect to the median vertical axis of the tank, and without a stirrer connecting member intruding through the tank.

As a preference, the method involves heating the liquid in the tank during stirring. Heating is performed preferably by the direct and distributed application of heating elements against the external surface of the tank. The distribution of the heating elements preferably produces a mean electrical power density at the heated surface of between 15 and 25 watts per $cm^2$ of the heated area. The area of the total heated surface covered by the heating elements is also preferably at least 40%, preferably between 40 and 60% of this area. A direct application associated with a distribution of power of the heating elements, as suggested, makes it possible to obtain a hot froth in the tank more quickly while at the same time reducing the risk of solid residue sticking to the bottom of the tank. This then yields a froth which is stable and hot while at the same time minimizing solid residue against the walls of the tank and therefore also making the appliance easier to clean. Such a method finds a particularly suitable application in the preparation of beverages such as cappuccinos in combination with or incorporated into a coffee machine.

An appliance for preparing a milk froth is depicted with reference to FIG. 1. An appliance such as this is used to produce froth from a food liquid that has the property of emulsifying under the combined effect of mechanical stirring and heat, for example, a milk product such as fresh milk, pasteurized or UHT milk, skimmed milk, semi-skimmed milk or whole milk, a milk reconstituted from powder and water or from a milk concentrate and water or alternatively a mixture of milk with some other ingredient such as coffee.

The appliance 1 according to the invention comprises a cordless foaming unit 2 and an electrical base unit 3 onto which the foaming unit 2 is electrically connected simply by standing it on the latter. The electrical base unit 3 is powered with electrical current from the mains by a lead 30. The cordless foaming unit 2 comprises, on the side, a handle 28 so that it can be handled with ease, such as for lifting it up, emptying out its contents after frothing or cleaning it after having emptied it of its contents. The unit comprises a stand 20 on which the handle 28 is mounted, the stand being closed by a removable lid 22. The latter protects the interior, for example, against dust from the exterior, and protects the exterior from the interior, particularly preventing any liquid or froth from splashing out when the unit is activated during the stirring operation.

Figure 2:
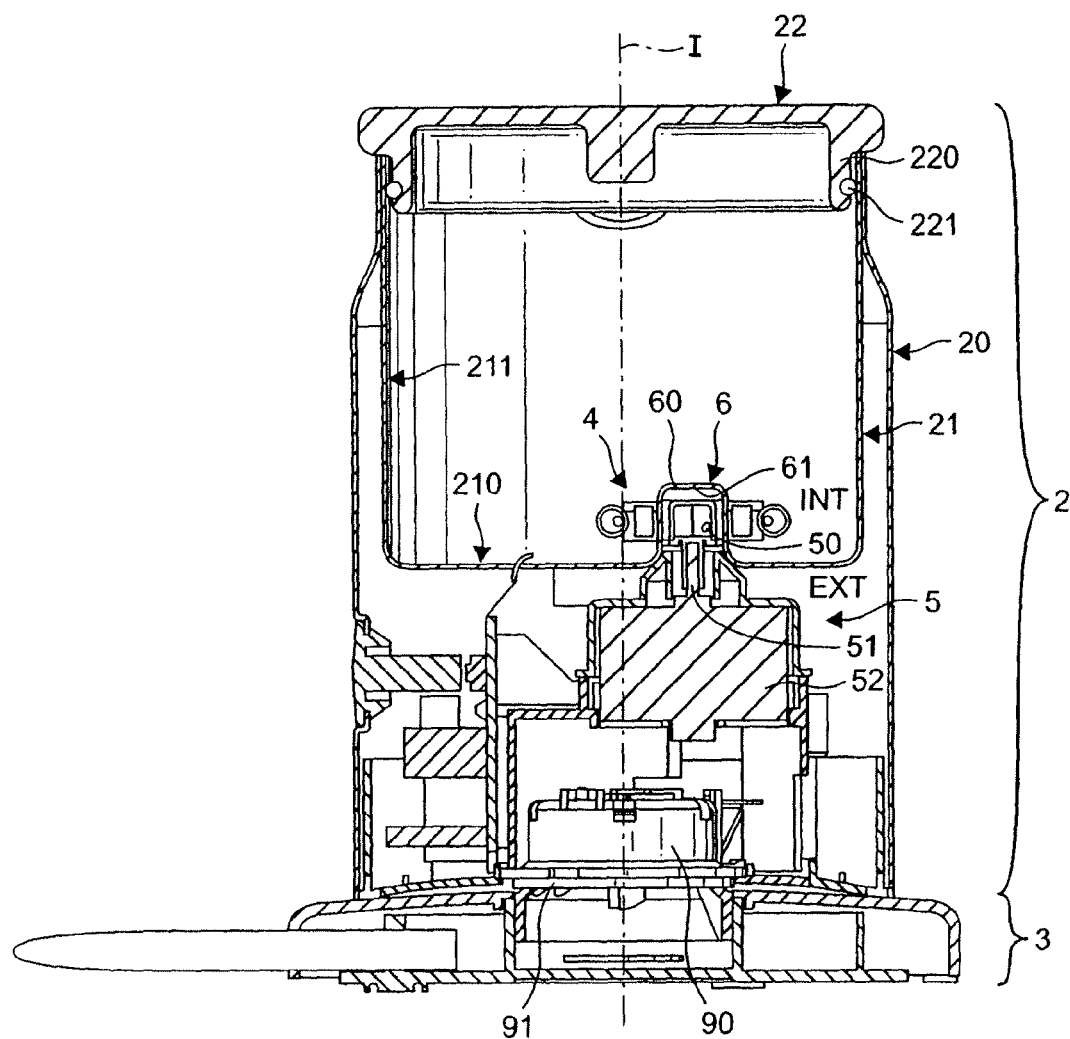
FIG. 2 shows a view in section on A-A of the appliance of FIG. 1.
Figure 3:
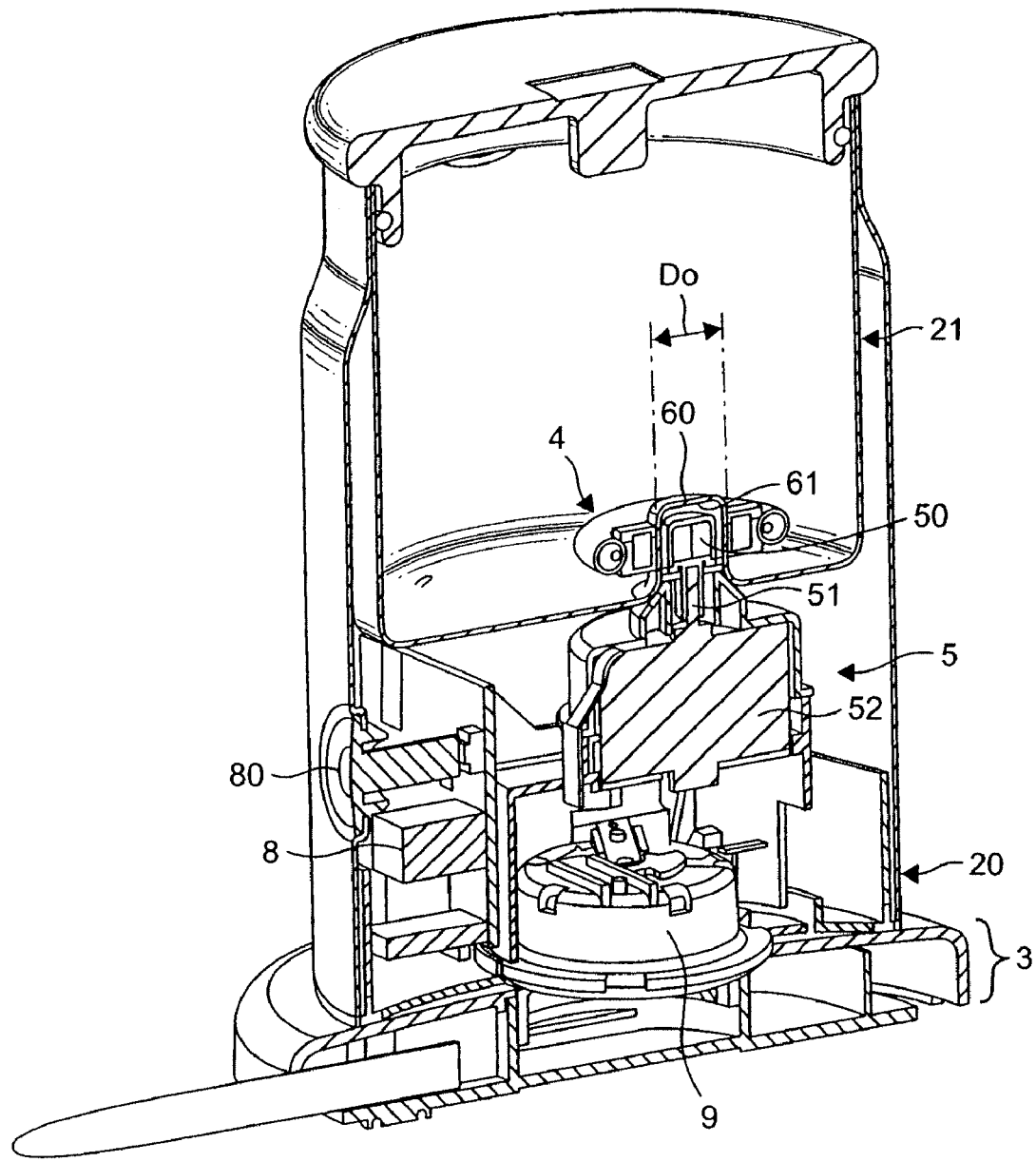
FIG. 3 shows a perspective view in section on A-A of the appliance of FIG. 1.

The appliance will now be described in greater detail with reference to FIGS. 2 and 3. The foaming unit 2 comprises the stand 20 in which a tank 21 is mounted. The tank 21 receives the liquid that is to be heated and foamed. It needs to be sealed and of a capacity suited to the volume of froth to be produced. In general, an appliance such as this is designed to produce milk froth with a volume ranging from 50 to 100 cm$^3$, able to serve milk froth for one to three beverages of the cappuccino type. However, a larger-capacity tank may be envisaged according to the need. Of course, the appliance of the invention may also be used to produce a hot liquid when the stirring operation is eliminated or the means for performing this operation are deactivated.

On the interior (INT) of the tank is positioned a stirrer 4. Means 5 for driving the stirrer 4 are, for their part, positioned on the exterior (EXT) of the tank, preferably in the space between the tank and the interior of the stand 20. The stirrer 4 and the driving mechanism 5 are positioned relative to one another in such a way as to create forced stirring of the liquid inside the tank without the use of an intrusive means crossing the tank. To do that, the stirrer and its driving mechanism are of the magnetic type which means that the driving mechanism 5 produces a rotary magnetic field that drives the stirrer, itself equipped with a means slaved to the magnetic field. The magnetic means are positioned in an offset manner with respect to the central axis "I" of the tank so that the stirrer is made to rotate thus circulating the liquid or froth in a way which is not coaxial to the median central axis of the tank. In fact, through such a configuration, the liquid and then the froth tend to circulate more or less producing an asymmetric cone more or less centred on the centre of the stirrer. This makes it possible to avoid the formation of layers of constant speed which remain circulating at the same radius and therefore do not mix with one another. The layers by contrast do mix with one another because, on the same radius, the layers are circulating at different speeds; in particular, for a given radius, the layers circulate at higher speeds on the side where the stirrer is furthest from the edge of the tank and at slower speeds on the side where the stirrer is closest to the edge. This encourages all the liquid or froth to circulate inside the tank, prevents the stagnation of layers of liquid or froth and thus reduces the areas where there is little or no stirring taking place.

To guarantee controlled rotation of the stirrer in the tank without the risk of the latter moving and therefore avoiding loss of control of the magnetic field, a means 6 for positioning the stirrer is provided in the bottom 210 of the tank. The positioning means is thus positioned eccentrically in the tank but in relation to the position of the magnetic field so as to allow the stirrer to be rotationally driven. In the case illustrated, the positioning means 6 is a relief formed in the wall of the tank and around which the stirrer 4 is guided in rotation without excessive friction. The positioning means could have other configurations and could, for example, be a recess, into which part of the stirrer is then inserted.

Figure 4:
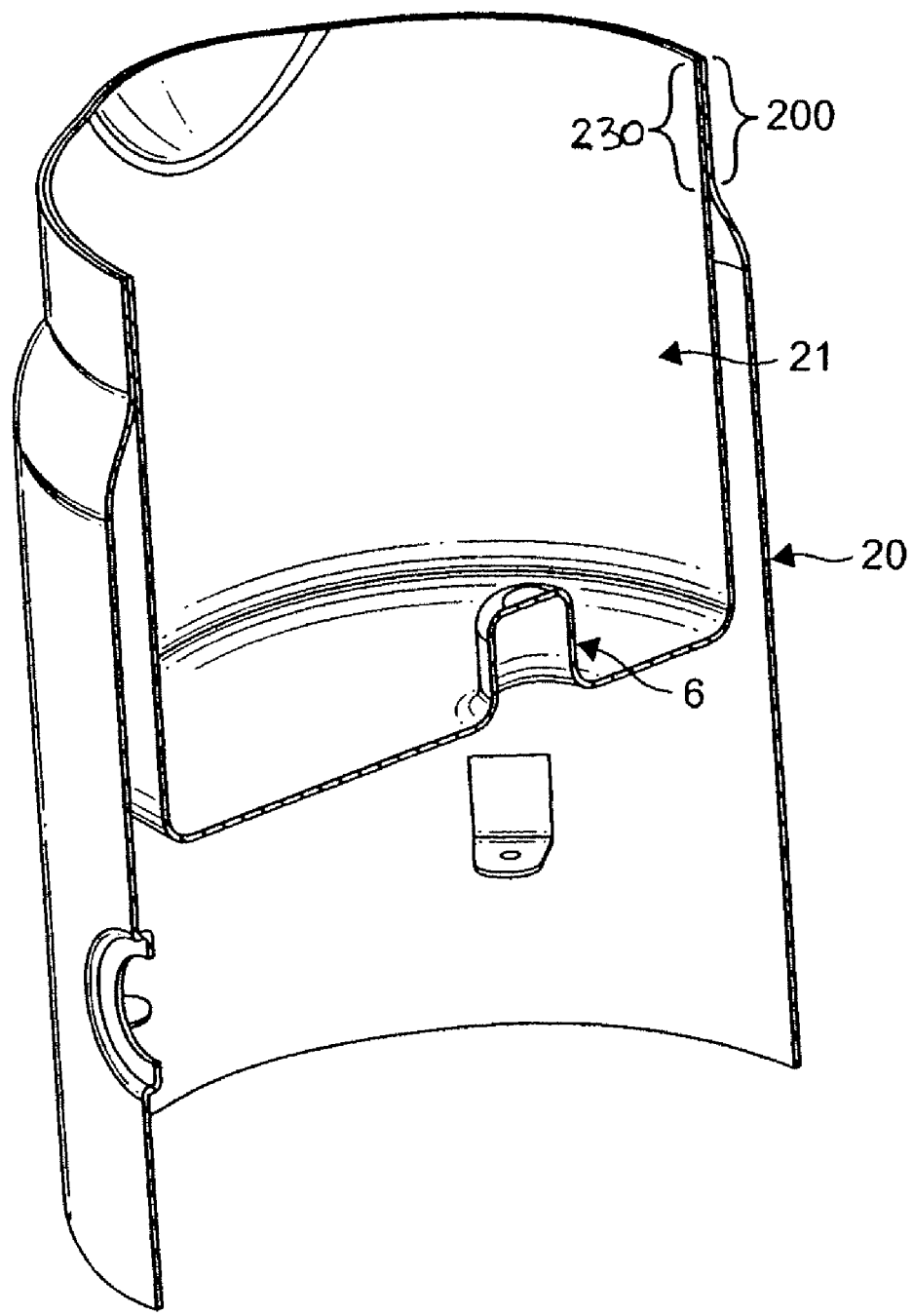
FIG. 4 shows a view in perspective and in section on A-A of part of the appliance, particularly of the tank and of the stand taken in isolation.

One advantage of a non-intrusive driving mechanism is that it is possible to construct a tank in which the liquid-receiving part, and at least its bottom, comprises no join line or discontinuous connection or line demarcating orifices or the like able to create areas which present a potential hygiene problem and/or areas that are difficult to clean or rinse. Thus, the liquid-receiving surface of the tank is preferably formed as an integral piece. Within the meaning of the invention, welds forming a continuous seam between two elements for example, are not considered to be joining lines or discontinuous connections. By contrast, a joint using screws, rivets or a nested fit is considered to be a join or discontinuous connection liable to pose hygiene problems. In particular, cleaning problems could arise if food solid residue can become embedded and settle in interstices of the join. The tank 21 consisting of its raised surfaces 211 and its bottom 210, therefore forms a surface for contact with the liquid that is substantially smooth, with no areas encouraging attachment of solid food matter such as protein or the like. Such a tank can be made from a metal that is a good conductor of heat such as stainless steel, copper or aluminium. It may, for example, be moulded as a single piece. In the construction illustrated in FIG. 4, the tank 21 is connected to the edges 200 of the stand 20 by its top edges 230 by any appropriate connecting means such as welding, brazing, bonding or clipping. The tank alone may also be mounted removably with respect to the stand so that it can easily be removed for cleaning in a dishwasher. The lid 22 is connected to the tank as a tight fit via an engagement edge 220 and a deformable elastomeric or plastic gasket 221. Other means for closing the lid 22 are possible, such as screw-fastening or elastic clipping.

To drive the stirrer, the driving mechanism 5 are arranged to produce a magnetic field passing through the positioning means 6 which forms the relief 60 on the interior (INT) of the tank. To do that, the driving mechanism 5 comprises a magnetic drive portion 50 housed in the part forming a recess or indentation 61 when viewed from the exterior (EXT) of the tank. This magnetic drive portion thus comprises one or several elements 500 made of ferromagnetic material. The magnetic drive portion 50 is itself driven in direct rotation by a drive spindle 51 connected to an electric motor 52 vertically aligned with the positioning means 6. In order to obtain advantageous results in terms of froth production, the rotational speed of the stirrer is controlled so that it reaches at least 1500 revolutions/min. As a preference, the speed is at least 1650 revolutions/min, and more preferably still, between 1800 and 2500 rpm.

Figure 5:
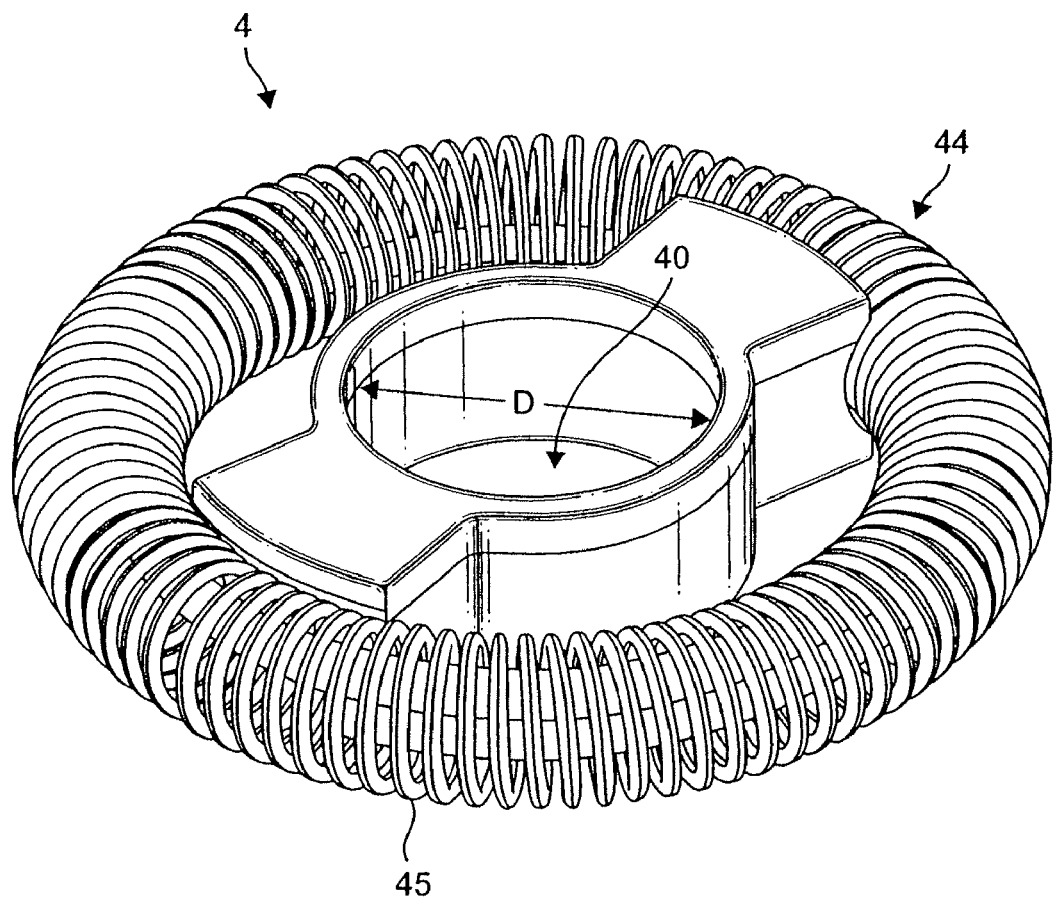
FIG. 5 shows the stirrer of the appliance.
Figure 6:
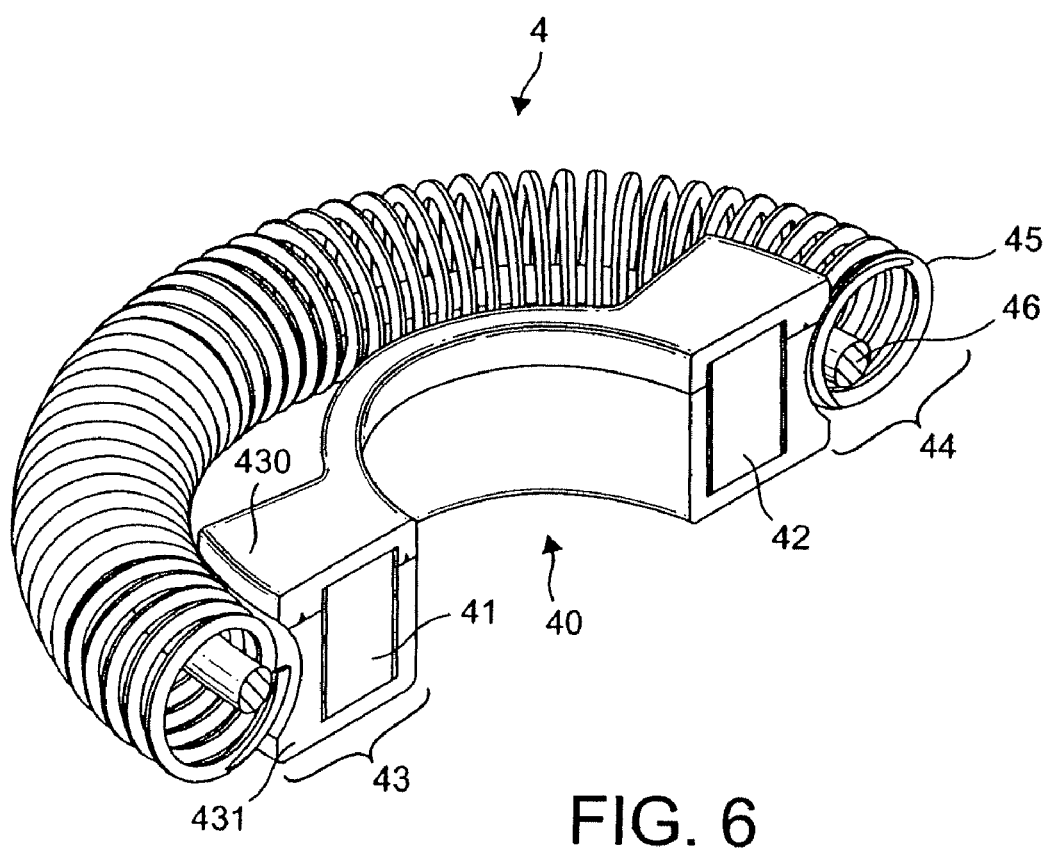
FIG. 6 shows the stirrer in section.

As shown by FIGS. 5 and 6, the stirrer 4 according to one embodiment of the invention has an annular overall shape allowing it to fit freely around the relief-forming positioning means. The relief preferably is in the shape of a cylinder. The stirrer 4 is thus equipped with a central slot 40 of a complementary shape and of an inside diameter D slightly larger than the outside diameter $D_o$ of the external surface of the relief 60. The diameters are thus determined one relative to the other, so as to allow rotation without excessive friction or, at least, with a minimum of friction, while at the same time ensuring an effective magnetic connection with the driving mechanism. The stirrer comprises at least one magnetically slaved portion which possesses elements made of ferromagnetic material such as a pair of magnets 41, 42 which are housed in a plastic support 43 which may be injection-moulded around the magnets or assembled in several parts 430, 431 by clipping, bonding or any other means. The stirrer possesses an external or peripheral portion 44 which comprises the actual stirring elements proper. In the embodiment depicted, these elements are formed by a series of turns 45 of wire in the overall shape of a torus. To prevent them from deforming, the turns 45 are held in place by an internal annular reinforcing element 46. When rotationally driven, such an element produces rapid emulsification of the liquid, particularly milk, especially when the frothing temperatures are obtained at the same time.

However, other equivalent configurations of the stirring elements may replace the one depicted. These may, for example, involve impellers, blades, gratings or needles or yet others.

Thus, when the motor is electrically powered, its spindle rotationally drives the magnetic drive portion 50 and this creates a rotary local magnetic field collaborating with the magnets 41, 42 and this as a result causes the stirrer to rotate about the relief. The rotational speed of the stirrer is thus regulated to the rotational speed of the motor spindle.

According to one aspect of the invention, a heating device are provided to heat the tank during stirring. Heating facilitates the production of froth and considerably reduces the stirring time. The froth is also preferably served hot, particularly when intended for hot beverages such as cappuccinos. To do that, in one embodiment of the invention, means for direct heating of the tank are provided. A direct heating device is understood as meaning means of the heating resistive type or equivalent, electrically insulated but thermally directly associated with the surface of the tank.

In one embodiment of the invention, the direct-a heating device comprise a heating circuit of the "thick film" type printed directly onto the external surface of the tank, preferably onto the external surface of the bottom of the tank. The advantage with this technology is that it provides a good distribution of the power transmitted to the tank (that is to say, therefore, a greater density in watts per square centimeter). In consequence, the liquid is prevented from sticking to the surface of the tank while at the same time ensuring excellent transmission of heat to the liquid.

Figure 7:
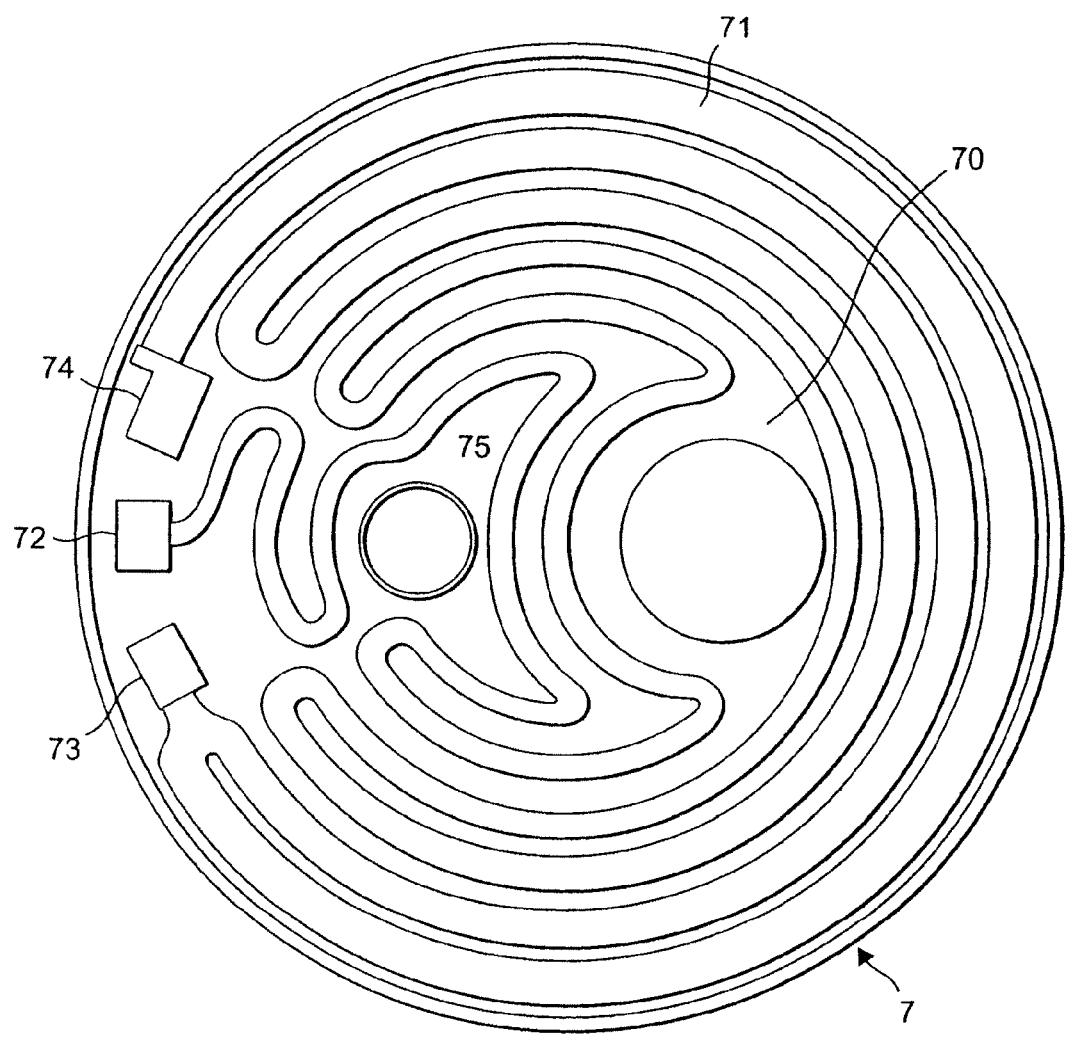
FIG. 7 shows the direct a heating device associated with the bottom of the tank of the appliance.

FIG. 7 illustrates one example of a type of printed heating circuit of this type. In one possible embodiment, a circuit extends over just the bottom of the tank (for example, as in the embodiment of FIG. 7). In another possible embodiment, a circuit extends over the bottom and the side walls of the tank. In another possible embodiment, several circuits are provided, at least one of them being on the bottom, and at least one on the sides of the tank.

The circuit 7 as depicted therefore comprises an insulating layer 70 associated with the external surface of the heated surface of the tank and a resistive heating printed track 71 which, in use, faces downwards. The track 71 is arranged in such a way as to produce a total power of about 250 to 1200 watts, preferably 400 watts applied to the heated surface. Its mean electrical power density with respect to the heated surface or circuit 7 is thus between 5 and 30 watts per cm$^2$, preferably between 15 and 25 watts per cm$^2$. The track 71 preferably covers at least 40% of the heated surface, and more preferably still covers more than 50% thereof, so as to produce an adequate distribution of the total power over the heated surface thus preventing the milk from sticking and turning brown on the internal surface of the tank. The mean density is calculated using the formula: mean density=total electrical power/total surface area (7).

Electrical contacts 72, 73, 74 are located at the ends of the tracks to provide the electrical connections for the circuit. According to one aspect of the invention, the electrical contacts are three in number, associated with three ends; thus, there is one contact 72 associated with neutral, one contact 73 associated with live and finally a third contact 74 connected to the low-voltage electric motor to power the latter at the required voltage (for example: 8.2 volts in the example shown). Such a configuration makes it possible to dispense with a transformer for operating the motor and therefore allows the cost and complexity of the system to be reduced. In one possible embodiment, the printed heating circuit comprises an intermediate metal backing plate separating the layer of insulation from the bottom of the tank. In this case, the backing plate is as thin as possible, preferably 1 mm thick or less. A backing plate separate from the bottom may be needed in an embodiment in which the tank is mounted removably with respect to the stand. However, in an embodiment in which the tank is permanently mounted, the circuit is preferably printed directly onto the tank.

Other technologies may replace a heating circuit of the "thick film" type, for example shielded resistors. However, this technology is less preferred because the transmission of power is not over such a large surface area (but is generally over a simple generatrix) and requires an additional operation of brazing the resistor directly against the surface of the tank. In consequence, in order to transmit the same power, the resistor has to be overheated and this creates areas where the milk tends locally to stick to the surface of the tank. Other a heating device comprise induction heating or infrared heating. These means may be combined or employed in place of the resistive means.

In one embodiment of the invention, a temperature sensor is provided to measure the temperature of the tank. The sensor may be attached to the insulated contact 75 of the "thick film" circuit 7, preferably near the middle of the bottom of the tank. The sensor may be of the NTC type connected to an electronic controller 8. The sensor may also be a simple sensor of the bimetallic strip type which is less precise and less repeatable but does not require associated control electronics. The contactors of the heating device are themselves electrically connected to the controller 8 by blades, wires and/or other means. When the temperature reaches a given set point temperature, the controller cuts off the electrical supply circuit to the a heating device. The set point temperature is determined such that the liquid is heated to below its boiling point, preferably in a temperature range that is optimal for frothing the liquid. In the case of milk, for example, the liquid temperature is brought to a temperature of between 60 and 80° C. in under 40 seconds, preferably between 65 and 75° C. in about 30 seconds. Of course, the temperature rise dynamics are partially dependent on factors such as the volume to be heated and the initial temperature of the liquid.

The stand comprises an "on" button 80 that the user can operate. When this button is pressed or activated by any other means it jointly switches on the electrical power supply to the a heating device and the electrical power supply to the electric motor for turning the stirrer. Thus, the liquid is both directly heated and stirred at the same time. A timer is associated to the a controller to automatically switch the electric motor off. The running period of the electric motor is programmed in the a controller as a function of the liquid to be frothed and its volume. For milk, the running period is fixed within a range period of from about 30 to 60 seconds. Preferably, the tank comprises a fill mark to visually indicate to the user the amount of liquid to be filled in the tank. The fill mark correspond to a predetermined level of liquid to be frothed and to programmed running period adapted to deliver the optimum froth. For example, a volume of about 50 ml of milk can thus be converted into a stable froth at 75° C. in under 30 seconds.

The cordless foaming unit 2 and the electrical base unit 3 are connected by a collection 9 of general connectors known as "cordless" connectors. A first connector is connected to the central lower part of the stand 20. The first connector is electrically connected to the electrical elements and control elements of the foaming unit, particularly the controller, the electric motor and the a heating device. A second connector of complementary shape is associated with the electrical base unit which can be connected to the mains by the electric lead.

The first connector 90 comprises electric terminals, typically a neutral, a live and an earth, concentrically arranged and which can collaborate with electric sockets of the second connector 91. The first and second connectors are configured in terms of their shapes to collaborate in engagement with one another simply by standing the foaming unit vertically (or more or less vertically) on the electrical base unit so that the electrical terminals (live, neutral, earth) of the first connector 90 connect on contact with the respective electrical sockets (live, neutral, earth) of the second connector 91. An example of a collection of connectors of this type which is known per se is described in detail in U.S. Pat. No. 5,971,810. The advantage of such a system is that, in the application of the invention, it allows the foaming unit to be disconnected easily so that the froth can be served and the tank can be cleaned. It also allows a tank to be designed which is equipped with a heating device directly associated with the a heating device, for better heating efficiency and therefore a lower froth preparation time. Other possible known types of cordless connector may be used as equivalent means without departing from the scope of the invention.

Figure 8:
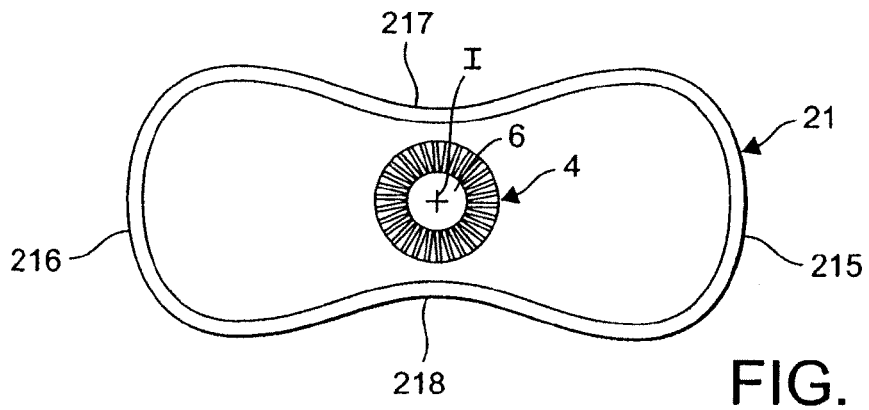
FIG. 8 shows a view from above of a variant shape of tank with its stirrer.

FIG. 8 depicts an embodiment in which the tank is non-cylindrical with respect to the vertical axis I. In this example, the tank 21 has an elongate shape with two convex first sides 215, 216 and two second sides 217, 218, at 90° to the first sides, which are concave. The stirrer 4 and the positioning means 6 will then be positioned at the middle of the tank as illustrated or alternatively may be offset from the middle. The shape of the tank is such that it produces a disturbed circulation of the liquid and the froth thus encouraging the rapid creation of froth and reducing any possible remaining volume of liquid.

Figure 9:
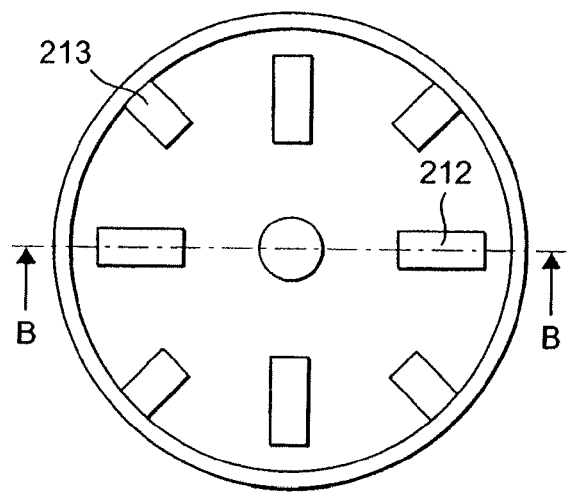
FIG. 9 shows a view from above of a variant tank with reliefs for disturbing the circulation of the fluid.
Figure 10:
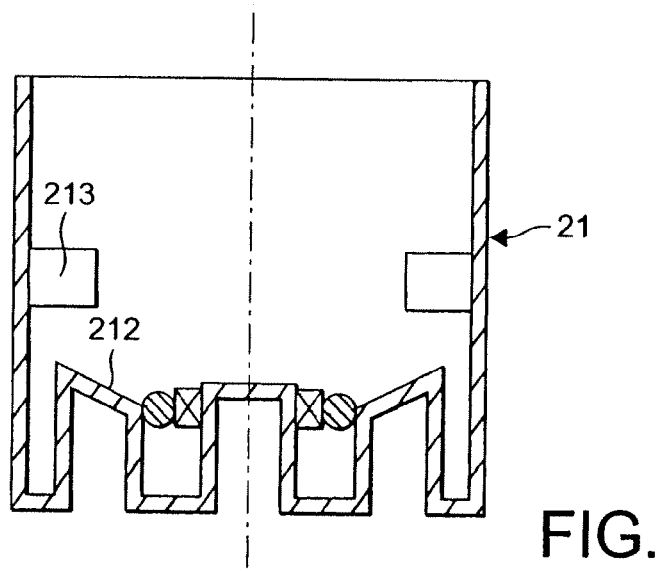
FIG. 10 shows a view in cross section on B-B of a variant of the tank of FIG. 9.

FIGS. 9 and 10 illustrate another embodiment of the invention, in which embodiment the tank 21 has walls and/or obstacles extending as reliefs offset from the median vertical axis I. In particular, in the example illustrated, a plurality of protrusions 212 for disturbing the circulation of fluid are present in the bottom and likewise 213 on the sides of the tank. These walls run more or less radially and along just some portions of the tank. They are preferably offset to encourage the fluid in the tank to flow in a sinuous path. It goes without saying that numerous different and equivalent arrangements are within the competence of the person skilled in the art without thereby departing from the scope of the invention.

What is claimed is:

1. An appliance for preparing a froth from milk or a milk-based liquid, comprising:
  a cordless frothing unit that includes:
    a tank to receive the liquid that is to be frothed, in which liquid a rotatable stirrer is positioned, the tank having internal and external surfaces, a median vertical axis and a bottom;
    a stand associated with the tank and having a bottom portion;
    a system for driving the stirrer, with the stirrer configured to be driven and held magnetically in the tank by the stirrer drive system; and
  an electrical power supply unit for supporting the stand and electrically powering the cordless frothing unit;
  wherein the cordless frothing unit is releasably engageable with respect to and removable from the electrical power supply unit.

2. The appliance of claim 1, wherein the driving system includes a positioning element for assisting in positioning the stirrer along an axis of rotation that is offset with respect to the median vertical axis of the tank so that the stirrer, when rotationally driven about the offset axis of rotation, produces non-coaxial circulation of the liquid with respect to the median vertical axis.

3. The appliance of claim 2, wherein the positioning element is a relief or a recess formed in the internal surface of the tank and has at least a shape that more or less complements the stirrer so as to accept the latter in rotational engagement, wherein the relief or recess and the bottom of the tank together form an integral wall.

4. The appliance of claim 3, wherein the stirrer has an annular shape with a central slot configured to engage with the relief, the relief projecting from the bottom of the tank into the interior thereof, with the stirrer having at least one magnetically slaved portion positioned near the periphery of the central slot.

5. The appliance of claim 3, wherein the stirrer drive system comprises a magnetic drive portion which engages the external surface of the tank and inside the relief in order to collaborate at least with the magnetically slaved portion of the stirrer, which magnetic drive portion is made to rotate by a spindle associated with an electric motor.

6. The appliance of claim 1, wherein the stirrer has a peripheral part possessing stirring elements including one or more of turns of toroidally-shaped wire, impellers, blades, gratings or needles.

7. An appliance for preparing a froth from milk or a milk-based liquid, comprising:
  a cordless frothing unit that includes:
    a tank to receive the liquid that is to be frothed, in which liquid a rotatable stirrer is positioned, the tank having internal and external surfaces, a median vertical axis and a bottom;
    a stand associated with the tank and having a bottom portion;
    a system for driving the stirrer, with the stirrer configured to be driven and held magnetically in the tank by the stirrer drive system;
  an electrical power supply having a base support; and
  the cordless frothing unit being removable with respect to the electrical power supply;
  wherein the cordless frothing unit includes a connection assembly comprising a first connector secured to the bottom portion of the stand and a second connector secured to the base support of the electrical power supply, the two connectors being connected together electrically in order to provide electrical power to the stand while the stand is standing on the base support.

8. The appliance of claim 1, which further comprises a heating device for heating liquid in the tank, wherein the heating device comprises electrically insulated heating resistive elements in contact with at least the bottom of the tank.

9. The appliance of claim 8, wherein the heating device consists of at least one thick film heating circuit in contact with the external surface of the tank.

10. The appliance of claim 8, wherein the heating device includes heating resistive elements of the shielded resistor type in contact with the wall, an induction or infrared heating device, or a combination thereof.

11. The appliance of claim 8, which further comprises a controller that includes a temperature sensor associated with the heating device, wherein the controller is configured to cut off power supplied to the heating device at a set point temperature that is determined so that the liquid is heated below its boiling point and during a preset time.

12. A method for preparing a froth from milk or a milk-based food liquid in the appliance of claim 1, which comprises: driving the stirrer by a magnetic drive effect about an axis of rotation that is offset with respect to the median vertical axis of the tank and at a speed that is sufficiently high to convert the liquid into froth while heating the liquid during the stirring to form the froth.

13. The method of claim 12, which further comprises rotationally driving the stirrer at a speed of at least 1500 revolutions/minute while controlling activation of the heating during the stirring to reduce stirring time.

14. The method of claim 12, wherein the heating is performed by direct and distributed application of the heating elements against the external surface of the tank.

15. The method of claim 13, wherein the distribution of the heating elements produces an electrical power density at the external surface of between 15 and 25 watts per $cm^2$ with an area of coverage of the external surface by the heating elements of at least 40%.

16. The method of claim 13, which further comprises sensing temperature associated with the heating elements, and cutting off the heating at a set point temperature that is determined such that the liquid is heated below its boiling point and during a preset time, with the heating elements distributed in such a way as to heat the bottom of the tank.

17. The method of claim 12, wherein the driving of the stirrer provides movement of liquid coaxially to the axis of the tank through a centrifuging effect in an asymmetric configuration which is non-intrusive along the tank internal surface, thus making the tank more hygienic and easier to clean.

18. The method of claim 12, which further comprises configuring the tank without a joining line or connection between parts and without any line demarcating an orifice in order to avoid soiling of any gap regions in such lines by the deposition of solids from the milk or milk-based food liquid to thus reduce hygienic risks and facilitate cleaning of the tank.

19. The appliance of claim 1, wherein the tank includes one or more disturbance members comprising walls or other obstacles extending in relief into the tank in a manner that is offset with respect to the median vertical axis for disturbing any purely coaxial circulatory movement of the liquid in the tank.

20. The appliance of claim 1, wherein the tank includes a disturbance member and the appliance further comprises a controller programmed to switch the direction of rotation of the stirrer several times while the liquid is being frothed in the tank.

* * * * *